United States Patent [19]
Pollard

[11] 3,725,742
[45] Apr. 3, 1973

[54] STATIC CIRCUIT BREAKER
[75] Inventor: Ernest M. Pollard, Cherry Hill, N.J.
[73] Assignee: General Electric Company, Philadelphia, Pa.
[22] Filed: Feb. 23, 1972
[21] Appl. No.: 228,493

[52] U.S. Cl. ............317/33 SC, 317/50, 307/252 M, 307/252 T, 307/284, 321/45 C
[51] Int. Cl. ...............................................H02h 7/00
[58] Field of Search .............267/284, 252 M, 252 T; 321/45 C; 317/33 SC, 20, 50; 323/22 SC

[56] References Cited

UNITED STATES PATENTS

| | | |
|---|---|---|
| 3,558,983 | 1/1971 | Steen................................317/33 SC |
| 3,109,977 | 11/1963 | Redfern...........................323/22 SC |
| 3,450,894 | 6/1969 | Pollard................................317/50 |
| 3,444,449 | 5/1969 | Napoli................................318/227 |

*Primary Examiner*—J. D. Miller
*Assistant Examiner*—Harvey Fendelman
*Attorney*—J. Wesley Haubner et al.

[57] ABSTRACT

Disclosed is a 3-phase static circuit breaker including three phase switches, each switch including a pair of power thyristors connected in inverse parallel relationship with one another and a common commutation circuit. A common surge suppressing circuit for all the switches is also provided in the static circuit breaker.

9 Claims, 1 Drawing Figure

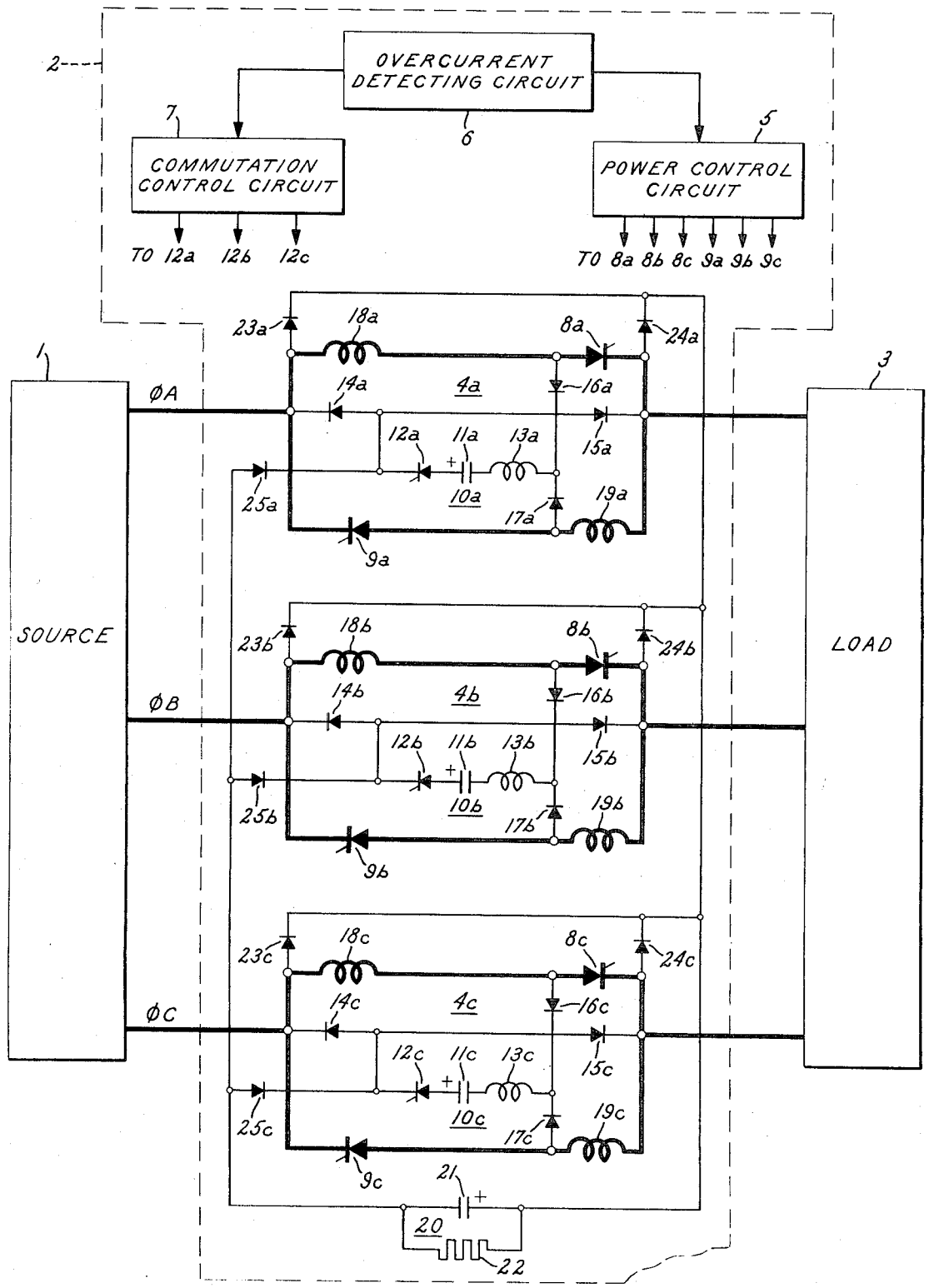

STATIC CIRCUIT BREAKER

BACKGROUND AND OBJECTS OF THE INVENTION

This invention relates to forced commutation static switches which are adapted to be connected to an electric power circuit for selectively permitting or blocking the flow of alternating current therein. More particularly, this invention relates to a thyristor-composed-A-C switch including commutation means selectively operative for interrupting current through the switch and voltage surge suppression means. The following published art, now known to applicant, is exemplary of prior art approaches relevant in this area of technology: U.S. Pat. Nos. 3,109,977 (Redfern); 3,444,449 (DeNapoli et al) and 3,450,894 (Pollard).

In the art of electric power distribution and utilization it is a common practice to employ switches or circuit breakers in order to initiate or terminate the flow of load current on command from the control circuit. The switches may advantageously be constructed of solid state controllable switching devices such as thyristors. A silicon controlled rectifier (SCR) is one type of thyristor useful in such switches. Since thyristor switches do not utilize any moving parts for circuit completion or interruption, they are known in the art as static switches. Static switches may be provided with overcurrent protective means to enable them to interrupt the flow of current in response to a sensed overcurrent of a preselected magnitude.

As is well known, an SCR comprises a body of semiconductor material having a plurality of layers of alternate P and N type conductivities which form a plurality of back-to-back rectifying junctions therein. The semiconductor body is disposed between a pair of main electrodes, one known as the anode and the other as the cathode. Thyristors additionally include some form of gating means (e.g., in a conventional SCR it is the gate) which is operative for initiating current conduction between the anode and cathode. When connected to a source of voltage and a load an SCR will ordinarily block appreciable current flow between its anode and its cathode until triggered or fired by a signal to its gate at a time when its anode is biased positive with respect to its cathode, whereupon it abruptly switches to a relatively low-resistance conductive state. Once conducting, the SCR will continue to conduct load current even if no further triggering is provided, so long as the magnitude of the current is above the predetermined holding level. When the magnitude of current drops below that level, the SCR switches to a relatively high resistance state whereupon the flow of load current is blocked until the SCR is subsequently retriggered. Therefore, when connected to an A-C power source an SCR will necessarily cease conducting at the occurrence of a natural current zero.

SCR's are unidirectional controlled switches, therefore in an AC power distribution system they are normally connected in an inverse parallel configuration to form a static switch having a pair of conducting paths (one path conducts positive or forward half cycles of load current and the other path conducts negative or reverse half cycles of the load current).

A control circuit is normally provided for supplying gate signals to the switch or power SCR's to initiate and maintain conduction therein. The control circuit includes means for effectuating current interruption in response to a sensed fault or overcurrent. This may be accomplished by stopping the supply of gate signals from the control circuit, whereupon the switch or the power SCR's would commence blocking load current at the occurrence of the next natural current zero. It should be noted that this manner of current interruption may allow the fault current to build up to dangerous levels before the conducting switch regains its blocking state at the next current zero following the fault current's detection.

In order to provide current interruption capability within a fraction of a half cycle of the alternating source voltage, means must be provided to force the conducting power SCR off (i.e., return it to its blocking state). The process of turning off the conducting power SCR is known in the art as forced commutation or simply commutation. A static switch equipped with commutation means for interrupting load current within a fraction of a half cycle of the detection of a fault is known as a current limiting switch. Such a switch limits the magnitude of fault current to an acceptable maximum by interrupting the fault current early in its half cycle (i.e., before it reaches its available peak magnitude).

The commutating means can take a variety of forms which are well known in the art. One commonly used commutating circuit comprises a charged capacitor connected in series with a thyristor (the thyristor is known in the art as a commutating thyristor and the capacitor is known as a commutating capacitor), the circuit thus formed being connected in shunt with the power SCR forming one conducting path of the static switch to quench that SCR when the commutating thyristor is turned on. A second such circuit is connected across the power SCR forming the oppositely poled conducting path. For a three-phase switch, six separate commutating thyristors and six separate commutating capacitors are required to provide such bidirectional commutating means.

The primary object of my invention is to provide a bidirectional-current limiting-static switch utilizing fewer commutating components than the prior art.

It is a further object of my invention to provide a bidirectional current limiting static switch utilizing a common commutation circuit.

When power thyristors of the static switch are in their nonconducting state (i.e., are blocking the flow of current to the load), a severe, externally originated voltage surge may damage the reverse-poled, nonconducting power thyristors. The surge may arise on either the source side or the load side of the static switch.

Accordingly, it is a further object of my invention to provide a bidirectional, current limiting, static switch including means operative for protecting the switch from externally produced voltage surges.

It is yet a further object of my invention to provide a bidirectional, current limiting, static switch having means operative for protecting the switch from voltage surges arising either on the source or on the load side thereof.

It is still a further object of my invention to provide a bidirectional, current limiting, static switch having a minimal number of commutating components and having relatively simple means for protecting the static switch from external voltage surges arising on either side of the switch.

SUMMARY OF THE INVENTION

In accordance with one aspect of my invention I provide a current limiting static switch adapted to be connected between a voltage source and a load and including voltage surge protection circuitry. The switch is made up of two power thyristors connected in inverse parallel relationship with one another to form a pair of conducting paths (one path for conducting positive polarity current and the other path for conducting negative polarity current).

A common commutation circuit is connected through unipolarity conducting means to each conducting path for rendering the power thyristor thereof nonconductive upon command. The commutation circuit includes a commutating capacitor connected in series with a normally nonconductive commutating thyristor.

In accordance with another aspect of my invention a common damping circuit is coupled to the switch. The damping circuit serves to absorb and dissipate any voltage surges whether arising on the source side of the switch or on the load side thereof. In so doing the power thyristors are protected from externally produced, reverse voltage surges which may arise at a time when they are in their nonconductive states.

BRIEF DESCRIPTION OF THE DRAWING

This invention will be better understood and its various objects and advantages will be more fully appreciated from the following description taken in conjunction with the accompanying drawing which is a schematic diagram of a power system utilizing a static switch in accordance with my invention.

DETAILED DESCRIPTION OF THE PREFERRED EMBODIMENT OF THE INVENTION

As can be seen, a 3-phase alternating voltage source is arranged to supply electric power to a load 3. In order to initiate or terminate the flow of current to the load a static circuit breaker 2 is provided between the source and the load. This circuit breaker includes a solid state or static switch connected in each phase of the system. For example, switch 4a is provided in phase A. Switch 4b is provided in phase B and switch 4c is provided in phase C. In order to control conduction of the static switches, i.e., initiate or terminate current conduction therein, the breaker also includes a power control circuit 5 having two states or modes namely "ON" and "OFF." When the control circuit is actuated from its ON to its OFF states the static switches interrupt the flow of current to the load. Further, the breaker includes commutation means to force commutate the static switches at high speed response to the detection of a fault current by an over-current detecting circuit 6. The commutation means are controlled by a commutation control circuit 7.

Each static switch comprises at least a pair of power thyristors connected in inverse parallel relationship with one another to form two conducting paths through which load current may flow. For example, switch 4a includes power thyristors 8a and 9a, switch 4b includes power thyristors 8b and 9b, and switch 4c includes power thyristors 8c and 9c.

Control circuit 5, in its ON mode, provides suitable gate signals to the power thyristors to render the switches conductive, whereupon load current is enabled to flow between the source 1 and the load 3 in either direction. In its OFF mode no gate signals are provided by the power control circuit to any of the switch power thyristors. Hence, when control circuit 5 is in this mode the static switch 4 blocks the flow of load current.

Static circuit breaker 2 is of the current limiting type and is therefore equipped with means for rapidly forcing all of the conducting power thyristors off in response to a sensed fault. In accordance with one aspect of my invention that means includes a common commutation circuit in each phase switch. For example, a commutation circuit 10a is provided in phase switch 4a, and includes a commutation capacitor 11a, a commutating thyristor 12a and a commutating inductor 13a. In a similar manner a commutation circuit 10b is provided in switch 4b and includes a commutating capacitor 11b, a commutating thyristor 12b, and a commutating inductor 13b and a commutating circuit 10c, is provided in switch 4c and includes a commutating capacitor 11c, a commutating thyristor 12c and a commutating inductor 13c. Each of the switches includes a plurality of unipolarity conducting elements 14a, 15a, 16a, 17a, 14b, 15b, 16b, 17b, 14c, 15c, 16c and 17c which, as is shown, are preferably diodes.

In switch 4a the anodes of diodes 14a and 15a are connected to one another and to the cathode of the commutating thyristor 12a and the cathodes of diode 16a and 17a are connected to one another and to one side of the commutating inductor 13a so that the commutation circuit 10a shunts power thyristor 8a via forward poled diodes 14a and 17a and power thyristor 9a via forward poled diodes 15a and 16a. The diodes and switches 4b and 4c are connected in identical manners.

Although each commutating thyristor may be identical to its associated power thyristors, it is desirable to utilize commutating thyristors having a lower steady state rating than the power thyristors since the former will be required to handle switching currents for only a short period of time. Higher forward blocking voltage capability is required of the commutating thyristor, as is the ability to handle high rates of rise of inrush current.

Each commutating capacitor in the commutating circuits are charged to a D-C voltage level, the polarity of which is shown. Although not shown in the drawing use of a precharging scheme such as that shown and claimed in U.S. Pat. No. 3,098,949-Goldberg is contemplated.

When a fault occurs, current flowing in the switch increases abnormally. When the magnitude of fault current attains a preselected level, overcurrent detecting circuit 6 is actuated and immediately provides a "stop" signal to the power control circuit 5 and to the commutation control circuit 7. Upon receipt of a "stop" signal, control circuit 5 ceases producing gate signals for the power thyristors. In response to the same event, commutation control circuit 7 is arranged to supply a trigger signal to the commutating thyristors of each of the switches. Upon receipt of the trigger signals at their gates the commutating thyristors commence conducting whereupon the energy stored in their associated commutating capacitors begins discharging.

The flow of current in the reverse direction through the fault current carrying power thyristor acts to quench conduction therethrough so that the power thyristor quickly returns to its nonconductive state and the fault current switches to the associated conducting commutating thyristor. Since each commutating circuit includes an inductor the current flowing therethrough is oscillatory in nature. Accordingly, at the occurrence of the current zero the commutation thyristor in the commutating circuit ceases conducting and all load current through the switch ceases.

The above described commutation sequence can occur within a few hundred microseconds from the time a fault of a preselected magnitude is sensed. Therefore, the fault current which is permitted to flow can be limited to an acceptable magnitude (i.e., well below the available peak fault current magnitude) by the very rapid response of the static circuit breaker 2.

In order to ensure that most of the discharging energy from the commutating capacitor is channeled in the reverse direction through the fault current carrying power thyristor each switch includes a pair of impedance elements which are preferably inductors. For example, switch 4a includes inductors 18a and 19a, switch 4b includes inductors 18b and 19b and switch 4c includes inductors 18c and 19c. These inductors perform a decoupling function in that they serve to prevent the discharging current from the commutating capacitor from flowing through a path excluding the fault current carrying power thyristor. For example, absent the inductors and assuming that power thyristor 8a is conducting fault current, upon the conduction of commutating thyristor 12a some of the current discharging from the capacitor 11a may choose the path including diodes 14a and 16a thereby depriving the power thyristor of some reverse or quenching current.

The use of decoupling inductors in a bidirectional static switch including a pair of commutating circuits is taught in U.S. Pat. No. 3,558,983-Steen and is assigned to the same assignee as my invention.

In accordance with another aspect of my invention I provide means for protecting the static circuit breaker 2 from voltage surges or transients. To that end a single surge suppression circuit 20 is included in the breaker and is common to all of the phase switches. The circuit comprises an energy absorbing element or capacitor 21 shunted by an energy dissipating element or resistor 22. As connected the circuit is effective for suppressing voltage surges which might arise on either side of the static circuit breaker.

In my U.S. Pat. No. 3,450,894 I disclosed and claimed circuitry which is effective for suppressing surges arising on either side of a 3-phase static circuit breaker. As shown and described therein a single surge suppressing circuit is connected in shunt with each phase switch of a static circuit breaker via a diode bridge. The diode bridge is formed using some of the diodes which form an integral part of the individual phase switches of the static circuit breaker. This approach reduces the number of diodes needed to connect the surge suppressing circuit to the static circuit breaker without detracting from the ability of the common surge suppressing circuit to protect against voltage surges arising on either side of the circuit braker.

The mode of connection of the line and load surge suppressing circuit 20 in the three-phase circuit breaker 2 herein also enables this protective function to be performed with a common suppressor.

As can be seen a pair of diodes 23a and 24a are connected between the respective ends of switch 4a and a first side of the surge suppression circuit 20. In a similar manner a pair of diodes 23b and 24b are connected between the respective ends of switch 4b and the first side of the surge suppressing circuit 20 and a pair of diodes 23c and 24c are connected between the respective ends of switch 4c and the first side of the surge suppressing circuit 20. A diode 25a is connected between the second side of the suppression circuit 20 and the common point of diodes 14a and 15a. In a similar manner a diode 25b is connected between the second side of the suppression circuit 20 and the common point of diode 14b and 15b and a diode 25c is connected between the second side of the suppression circuit 20 and the common point of diodes 14c and 15c.

When connected in this manner diodes 23a–c, 25a–c and 15a–c form a diode bridge connecting the surge suppressing circuit in shunt with each phase switch in a direction effective for suppressing surges arising on the source side of the static circuit breaker. Diodes 24a–c, 25a–c and 14a–c form a diode bridge connecting the surge suppressing circuit in shunt with each phase switch in a direction effective for suppressing surges arising on the load side of the static circuit breaker.

Operation of the surge suppressing circuit 20 will be considered with respect to phase A, assuming that a surge arises on the source side of the switch when all of the switches are in their OFF mode. In such an event, the surge would be shunted away from the phase A switch 4a and through the surge suppression circuit 20 via the path including forward biased diode 23a, surge suppression circuit 20, forward biased diode 25a and forward biased diode 15a. The capacitor 21 in the circuit 20 serves to absorb the excess energy of the voltage surge and the parallel connected resistor 22 serves to dissipate that energy.

Operation of the surge suppression circuit for surges arising on the load side of the switch when the switch is in its OFF mode is identical to that above described except that the path through which the surge passes includes forward biased diodes 24a, the surge suppression circuit 20, forward biased diode 25a and the forward biases diode 14a.

While I have shown a resistor-capacitor surge suppressing circuit 20 it should be appreciated to those skilled in the art that other type surge suppressors can also be utilized (e.g., a gap type surge suppressor).

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirt and scope of my invention.

What I claim as new and desire to secure by Letters Patent of the United States is:

1. For use in a power system including an AC power source and a load, a bidirectional switch for conducting current between the source and the load and for interrupting the flow of such current upon command, said switch comprising:

a. first and second thyristors connected in inverse parallel relationship with one another to form first and second load current conducting paths, each of said thyristors including an anode and a cathode;

b. a first unipolarity conducting element having its anode connected to the anode of said first thyristor;

c. a second unipolarity conducting element having its anode connected to the anode of said second thyristor, the cathodes of said first and second elements being connected to one another at a first point;

d. a third unipolarity conducting element having its cathode connected to the cathode of said second thyristor;

e. a fourth unipolarity conducting element having its cathode connected to the cathode of said first thyristor, the anodes of said third and fourth elements being connected to one another at a second point; and f. a commutation circuit connected between said first and second points.

2. The bidirectional switch as specified in claim 1 wherein said commutation circuit comprises;

i. a third thyristor connected in series with a capacitor, the cathode of said third thyristor being connected to said second point.

3. The bidirectional switch as specified in claim 2 additionally comprising:

g. first impedance means connected in said first conducting path; and h. second impedance means connected in said second conducting path.

4. The bidirectional switch as specified in claim 3 wherein said first and second impedance means are inductors.

5. The bidirectional switch as specified in claim 3 wherein said first inductor is connected between the anode of said first thyristor and the cathode of said third element and wherein said second inductor is connected between the anode of said second thyristor and the cathode of said fourth element.

6. The bidirectional switch as specified in claim 1 additionally comprising;

g. a fifth unipolarity conducting element diode whose anode is connected to the cathode of said second thyristor;

h. a sixth unipolarity conducting element whose anode is connected to the cathode of said first thyristor and whose cathode is connected to the cathode of said fifth element at a third point;

i. a seventh unipolarity conducting element whose cathode is connected to said second point; and j. surge suppressing means connected between said third point and the anode of said seventh element.

7. The bidirectional switch as specified in claim 5 wherein said surge suppressing means comprises;

i. an energy storage element and ii. an energy dissipating element, said energy dissipating element being connected in shunt with said energy storage element.

8. The bidirectional switch as specified in claim 6 wherein said energy storage element is a capacitor and wherein said energy dissipating element is a resistor.

9. The bidirectional switch as specified in claim 2 additionally comprising;

g. a first inductor connected in said first conducting path between the anode of said first thyristor and the cathode of said third element;

h. a second inductor connected in said second conducting path between the anode of said second thyristor and the cathode of said fourth element;

i. a fifth unipolarity conducting element whose anode is connected to the cathode of said second thyristor;

j. a sixth unipolarity conducting element whose anode is connected to the cathode of said first thyristor and whose cathode is connected to the cathode of said fifth element at a third point;

k. a seventh unipolarity conducting element whose cathode is connected to said second point;

l. surge suppressing means connected between said third point and the anode of said seventh element, said surge suppressing means comprising:

i. a capacitor; and ii. a resistor, said resistor being connected in shunt with said capacitor.

* * * * *